United States Patent Office 2,910,512
Patented Oct. 27, 1959

2,910,512

METHOD FOR STABILIZING TRICHLOROETHYLENE

Antonio Ferri and Germano Patron, Milan, Italy, assignors to Sicedison S.p.A., Milan, Italy No Drawing. Application March 1, 1957
Serial No. 643,232

Claims priority, application Italy January 12, 1957

3 Claims. (Cl. 260—652.5)

The present invention relates to a method of preventing or inhibiting the decomposition of trichloroethylene, particularly as it may occur in the degreasing of metals.

It is known that trichloroethylene is a somewhat unstable compound and subject to decomposition by moisture, air, light and heat into hydrochloric acid, phosgene, carbon oxide, dichloroacetyl chloride.

The decomposition is promoted by the presence of metallic surfaces, such as steel and aluminum, which are of an autocatalytic nature. Moreover, the hydrochloric acid formed by the decomposition of trichloroethylene chemically attacks the metal surface which is in contact with the trichloroethylene with the formation of the respective metal chloride. Thus, in the degreasing of metals, these chlorides, and particularly, aluminum and iron chlorides, further promote the aforesaid trichloroethylene decomposition processes and, at the same time, cause an intense coloration which is due to the formation of polymerization or condensation products.

It is an object of the present invention to provide a stabilizer for trichloroethylene which will prevent or inhibit the decomposition reactions of the solvent, particularly where it is warmed in the presence of metals, moisture, oxygen or air, and light.

The present invention is based on the observation of the fact that there exists a synergistic action for stabilizing the trichloroethylene, when there are added thereto small quantities of isobutyl alcohol, and of α-pinene and/or β-pinene, or any desired mixture of α- and β-pinene, e.g. turpentine.

As it is known, the α-pinene and the β-pinene have the following structural formulae:

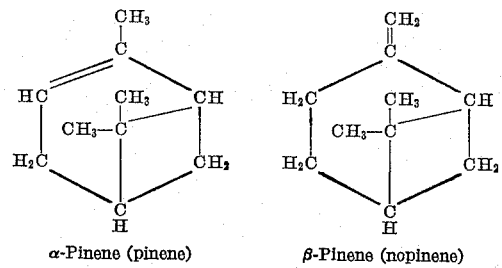

α-Pinene (pinene)    β-Pinene (nopinene)

EXAMPLE

Four samples A, B, C and D of trichloroethylene, of 200 cc. each, were taken and stabilized in different ways, and namely: sample "A" of trichloroethylene contains a standard stabilizer (pyridine) while samples "B," "C" and "D" contain, besides the same stabilizing agent as sample "A," also the stabilizing agents specified in the first column of Table I. In said table there are also indicated, in column 2, the results obtained in the stability test expressed in terms of acidity, as cc. of N/100 hydrochloric acid per 100 cc. of trichloroethylene.

Table I

| Type of trichloroethylene (different types of stabilizing agents) | Trichloroethylene acidity, after the stabilization test (cc. of N/100 HCl per 100 cc. of trichloroethylene) |
|---|---|
| A. 0.01% pyridine | 190 |
| B. 0.01% pyridine<br>0.1% isobutyl alcohol | 150 |
| C. 0.01% pyridine<br>0.02% β-pinene | 180 |
| D. 0.01% pyridine<br>0.1% isobutyl alcohol<br>0.20% β-pinene | 18 |

The acidity is developed during the stability test which consists of substantially continuously boiling and recollecting the condensed vapors, for 16 hours, in 500 cc. flask the four samples of trichloroethylene, the heat source being a 150 watt frosted lamp bulb placed under the flasks.

During the test a stream of oxygen saturated with water is bubbled through the trichloroethylene by means of a glass tube of 3 mm. diameter at the rate of 10 bubbles per minute. At the end of the test, the acidity of the trichloroethylene is determined.

The examination of the results as shown in Table I proves the technical progress achieved through the object of the present invention.

By using α-pinene instead of β-pinene similar results are obtained. The additives are preferably used in the following weight percentages:

Percent
Isobutyl alcohol _____ .001 to 1
Pyridine _____ .001 to 0.1
Pinene_____ .001 to 0.5

What we claim is:
1. A method for stabilizing trichloroethylene comprising adding thereto a synergistic ternary mixture of pyridine, isobutyl alcohol, and a pinene from the group of β-pinene, α-pinene and mixtures thereof.
2. Stabilized trichloroethylene comprising trichloroethylene intimately mixed with a synergistically active ternary mixture of pyridine, isobutyl alcohol, and a pinene from the group consisting of α-pinene, β-pinene and mixtures thereof.
3. A stabilizer for trichloroethylene consisting of a synergistic ternary mixture of pyridine, isobutyl alcohol, and a pinene from the group consisting of α-pinene, β-pinene and mixtures thereof.

References Cited in the file of this patent

UNITED STATES PATENTS

| 1,966,881 | Braun | July 17, 1934 |
| 2,096,737 | Dinley | Oct. 26, 1937 |
| 2,371,644 | Petering et al. | Mar. 20, 1945 |
| 2,721,883 | Stevens | Oct. 25, 1955 |